United States Patent [19]
Brunken

[11] Patent Number: 4,665,694
[45] Date of Patent: May 19, 1987

[54] FLUID FRICTION COUPLING

[75] Inventor: Gerd Brunken, Dittelbrunn, Fed. Rep. of Germany

[73] Assignee: Fichtel & Sachs AG, Schweinfurt, Fed. Rep. of Germany

[21] Appl. No.: 790,355

[22] Filed: Oct. 23, 1985

[30] Foreign Application Priority Data

Oct. 31, 1984 [DE] Fed. Rep. of Germany ....... 3439794

[51] Int. Cl.[4] .................. F16D 33/00; F16D 31/00
[52] U.S. Cl. .................................. 60/330; 192/58 B; 192/82 T
[58] Field of Search ............... 192/58 B, 82 T, 58 R, 192/58 A; 60/330, 338, 364

[56] References Cited

U.S. PATENT DOCUMENTS

| 3,059,745 | 10/1962 | Tauschek | 192/58 B |
|---|---|---|---|
| 3,648,811 | 6/1970 | La Flame . | |
| 4,064,980 | 12/1977 | Tinholt | 192/58 B |
| 4,076,110 | 2/1978 | Tinholt | 192/58 B |
| 4,312,433 | 1/1982 | Bopp | 192/58 B |

FOREIGN PATENT DOCUMENTS

| 0009959 | 4/1980 | European Pat. Off. . | |
|---|---|---|---|
| 1060143 | 3/1967 | United Kingdom . | |
| 1112557 | 5/1968 | United Kingdom . | |
| 1448704 | 9/1976 | United Kingdom . | |
| 2071283 | 9/1981 | United Kingdom | 192/58 B |

Primary Examiner—Edward K. Look
Attorney, Agent, or Firm—Toren, McGeady and Goldberg

[57] ABSTRACT

The fluid friction coupling, which is suitable especially for a fan of an internal combustion engine, comprises a buffer chamber (39) which receives a part of the entire quantity of shear fluid contained in the coupling, through an inlet opening (43) placed beneath the shear fluid level (47), when the coupling is not in rotation. The received partial quantity lowers the liquid level in the shear gaps (23). In cold starting therefore the coupling transmits a reduced torque, which by reason of the consequently increased slip increases the pump effect of a pump device (37) and reduces the fan noise. The quantity of shear fluid contained in the buffer chamber (39) is delivered again to the shear fluid cycle of the coupling with time retardation through a constricted opening (45) when the coupling is in operation.

6 Claims, 2 Drawing Figures

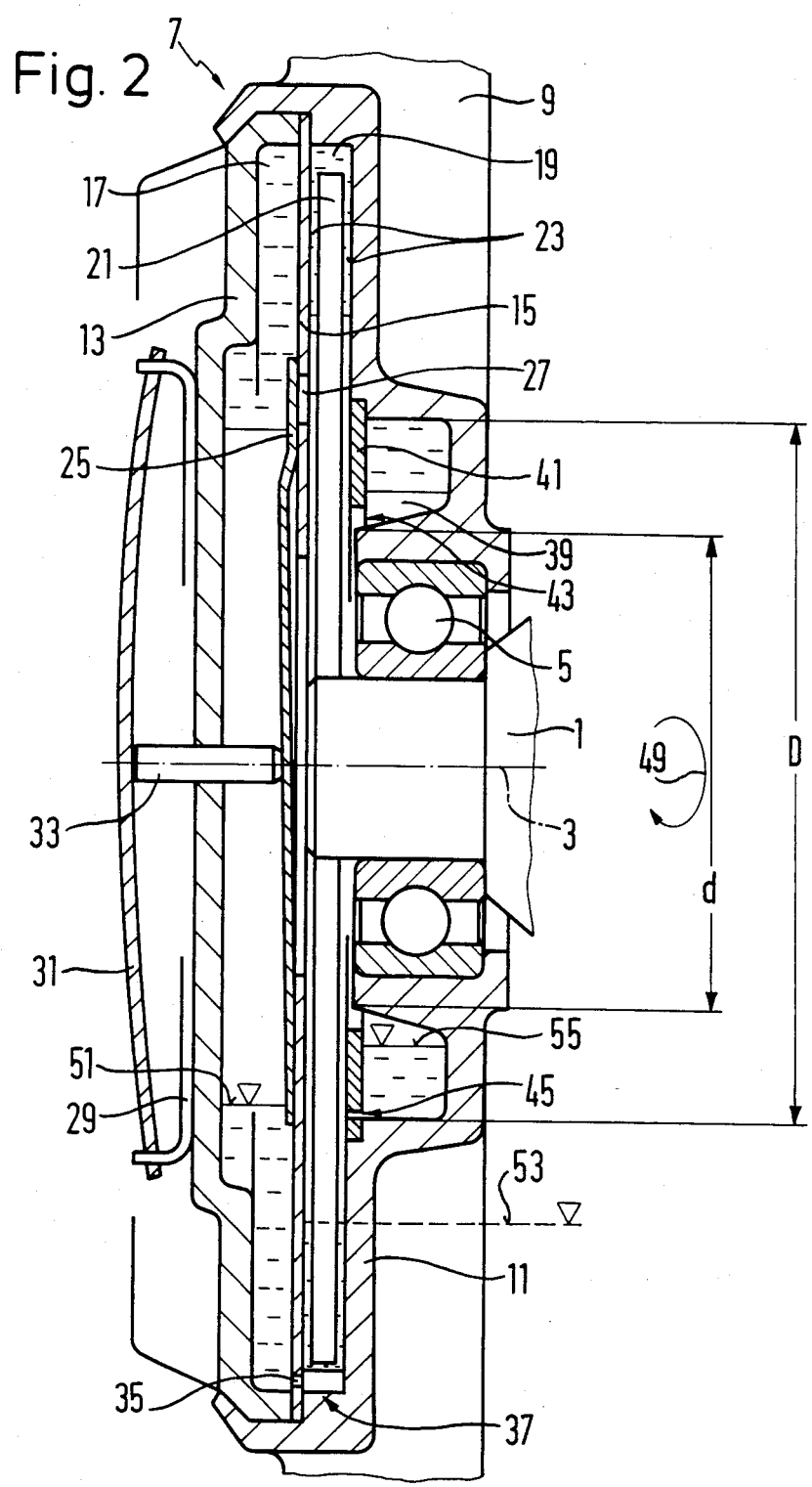

FLUID FRICTION COUPLING

BACKGROUND OF THE INVENTION

The invention relates to a fluid friction coupling, especially for a cooling fan of a fluid-cooled internal combustion engine.

A fluid friction coupling for a cooling fan of an internal combustion engine is known from European Patent Application No. 9,959, in which the internal combustion engine drives a rotor of substantially disc form seated on a drive shaft. A housing carrying the fan blades is rotatably mounted on the drive shaft. The housing contains a reservoir for shear fluid of high viscosity which is separated off by a partition from a working chamber enclosing the rotor. The working chamber together with the rotor defines at least one shear gap. A pump device, as disclosed in U.S. Pat. No. 3,208,041, delivers the shear fluid from the working chamber to the reservoir by way of a first opening provided in the partition in the region of the external diameter of the rotor. The supply of the shear fluid from the reservoir to the working chamber is controlled in dependence upon temperature by a valve. The torque transmitted by the fluid friction coupling depends upon the state of filling of the shear gap with shear fluid. In the cold condition the valve blocks the supply of shear fluid to the working chamber and the pump device pumps the shear fluid away, whereby the coupling is disengaged. In the hot condition the valve opens, whereby the shear gap is filled with shear fluid for the transmission of torque.

In conventional fluid friction couplings the shear fluid flows back by reason of the force of gravity through the opening of the pump device into the working chamber, when the coupling is not rotating. This is undesired since when the working chamber is filled the cold-start behavior deteriorates, especially at very low temperatures. Despite the fact that the internal combustion engine has cooled down, in such a case the fan coupling transmits the rotating movement of the drive shaft to the fan blades practically without slip, which is detrimental to a rapid warm-up of the engine. Furthermore the shear fluid is pumped away out of the working chamber only slowly, since the relative rotation rate between fan and housing is low. Moreover the fan coupling generates increased fan noises.

In European Patent Application No. 9,959 to improve the cold-start behavior the pump device opening provided in the radially outer region of the partition is conducted by way of a piece of tube in the reservoir close to the axis of rotation. This prevents the possibility of shear fluid running back into the working chamber when the fan coupling is not rotating. However the way of improving cold-starting as proposed in the European Patent Application brings only partial success, since it is a pre-requisite for this way that the fan coupling was disengaged and the shear fluid was situated substantially in the reservoir, when the internal combustion engine was halted. If however the engine is shut off with its cooling system in the hot condition, the fan coupling was engaged and the working chamber filled with shear fluid. On a subsequent cold start thus the above-explained disadvantages of conventional fan couplings result.

It is the problem of the invention to indicate a constructively simple way in which the cold-start behavior of the fluid friction coupling can be improved without it being important whether the engine is shut off in the cold or the hot condition.

SUMMARY OF THE INVENTION

Within the scope of the invention the fluid friction coupling comprises, in addition to the reservoir and the working chamber, a buffer chamber which when the rotor and housing are not rotating receives a part of the shear fluid contained in the housing and thus withdraws this fluid from the shear fluid cycle controlled by the pump device and the valve device. Thus compared with conventional fluid friction couplings, when the coupling is not rotating the shear fluid level is reduced both in the reservoir and in the working chamber. In cold starting the working chamber is therefore filled with less shear fluid than in conventional couplings, which reduces the disconnection delay of the coupling. The buffer chamber is connected through a constricted opening with the shear fluid cycle and returns the stored shear fluid again with delay. Therefore the entire quantity of shear fluid is available again for the subsequent normal operation of the coupling. The cold start behavior is improved irrespectively of whether the engine is switched off with the fan coupling hot or cold. In every case the buffer chamber ensures that from the outset a considerable slip already occurs between drive-input and drive-output of the coupling, which firstly limits the rotation rate of the fan and also ensures that the pump device immediately becomes effective to pump the remainder of the shear fluid out of the working chamber into the reservoir.

The collecting chamber is preferably made as an annular chamber concentric with the rotation axis, while the constricted opening by way of which the shear fluid is delivered to the cycle is expediently provided in the region of the external circumference and the inflow opening in the region of the internal circumference of the annular chamber. The inflow opening is expediently an annular gap, so that the shear fluid can enter in every position of the annular chamber in rotation.

The buffer chamber can be connected both with the working chamber and with the reservoir. It has proved favorable if the constricted opening of the buffer chamber opens into the working chamber, while the buffer chamber is arranged either in the rotor or, which is preferred, in a wall of the housing, especially on the side of the rotor remote from the partition. On this side the housing is mounted rotatably through a bearing on a drive shaft carrying the rotor, so that the space required for the bearing can be utilized at the same time for the space-saving accommodation of the annular chamber.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 shows an axial longitudinal section through a fan coupling of an internal combustion engine in the state of rest and FIG. 2 shows an axial longitudinal section through the fan coupling immediately after a cold start.

DETAILED DESCRIPTION OF THE DRAWINGS

Figure 1:
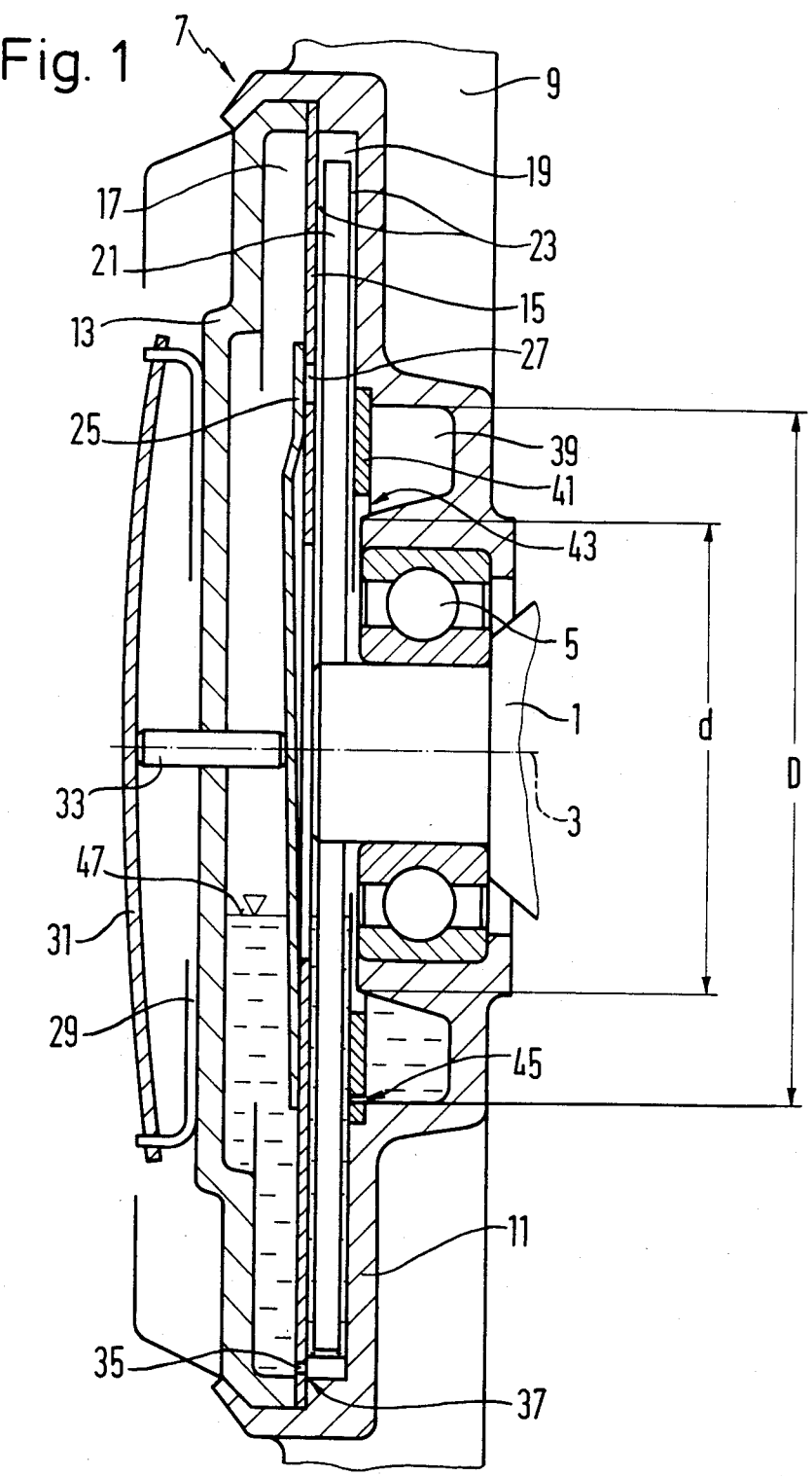

FIG. 1 shows a fan coupling for an internal combustion engine (not illustrated further) which drives a drive shaft 1 in rotation about a rotation axis 3. A housing, designated generally by 7, carrying a plurality of radially protruding fan blades 9 distributed in the circumferential direction, is seated, mounted rotatably by means of a ball bearing 5, on the drive shaft 1. The housing 7 consists of a pot part 11 mounted on the drive shaft 1 and of a lid part 13 tightly closing the pot part 11. A partition 15 inserted between the pot part 11 and the lid part 13 divides the interior of the housing into a reservoir 17 and a working chamber 19. A rotor 21 of disc form firmly connected with the drive shaft 1 is mounted in the working chamber 19 rotatably in relation to the housing 7. Relatively narrow shear gaps are provided between the axial side faces of the rotor 21 and the faces of the partition 15 and of the pot part 11 lying axially oppositely in each case. The shear gaps 23 can be filled in temperature dependence with a viscous shear fluid, in order to transmit a torque from the drive shaft 1 to the fan blades 9. For this purpose there is provided a valve plate 25 secured by one end to the partition 15, the free end of which plate controls an opening 27 in the partition 15. The valve plate 25 is stressed by reason of its own elasticity into a position keeping the opening 27 open and is controlled by a bimetallic element 31, secured by means of a holder 29 on the outside of the lid part 13, through a pin 33 guided axially displaceably in the lid part 13. In the cold condition the opening 27 is closed and in the hot condition it is opened. Shear fluid contained in the reservoir 17 can run through the opening 27 into the working chamber 19 and the shear gaps 23.

In the region of the external circumference of the rotor 21 a further opening 35 is provided in the partition 15, through which a pump device 37 pumps shear fluid out of the working chamber 19 and the shear gaps 23 back into the reservoir 17. The pump device 37 works for example according to the dynamic pressure principle and pumps the shear fluid back into the reservoir 17 in dependence upon the relative rotation rate between the rotor 21 and the housing 7.

The pot part of the housing 7 forms, on the side of the rotor 21 axially remote from the partition 15, an annular chamber 39 which, utilizing the axial space requirement of the ball bearing 5, surrounds the drive shaft 1 concentrically with the rotation axis 3. The annular chamber 39 is defined from the rotor 21 by an annular washer 41 which leaves in the region of the internal diameter d of the annular chamber 39 an annular gap 43 by which the annular chamber 39 is connected with the working chamber 19. In the region of the external diameter D of the annular chamber 39 the washer 41 is provided with a constricted opening 45 which likewise connects the annular chamber 39 with the working chamber 19.

FIG. 1 shows the fan coupling with the internal combustion engine stationary. The shear fluid collects in the lower region of the housing 7, its level lying at 47 above the lowest point of the annular gap 43. Thus the shear fluid also fills a segment of the annular chamber 39. The segment angle of the filled zone of the annular chamber 39 amounts to at least 60°. FIG. 2 shows the fan coupling immediately after a cold start of the internal combustion engine. The rotor 21, rotating in the direction of an arrow 49 about the rotation axis 3, drives the housing 7 through the shear fluid situated in the shear gaps 23. By reason of centrifugal force the shear fluid is distributed on the internal circumference of the housing. The shear fluid level of the reservoir 17 is represented at 51, the shear fluid level in the working chamber 19 at 53. The level 53 of the working chamber 19 is lower than the level 51 of the reservoir 17, since the reservoir is axially widened in its radially inner region. The shear fluid level in the annular chamber is designated by 55. The quantity of shear fluid held back by the annular chamber 39 reduces the quantity of shear fluid contained in the reservoir 17 and in the working chamber 19, so that the levels 51, 53 are lower than in fan couplings without annular chamber 39. By reason of the comparatively low level 53 in the working chamber 19 the torque transmitted immediately after the cold start is less than in conventional fan couplings, which increases the relative rotation rate between the rotor 21 and the housing 7 and thus the pumping effect of the pump device 37. The quantity of shear fluid in the working chamber 19, in any case lower, is thus pumped away more rapidly into the reservoir 17.

The quantity of shear fluid stored in the annular chamber 39 is delivered with delay through the constricted opening 45. By reason of its high viscosity in cold-starting the speed of outflow of the shear fluid is low, and the shear fluid supplied to the working chamber 19 can be pumped away forthwith by the pump device 37. In this case the transmitted torque is only inappreciably increased.

If the internal combustion engine is shut off in the operationally hot condition of the fan coupling and then started anew in the operationally hot condition, then the shear fluid which has collected in the annular chamber 39, as a result of its high temperature and thus its low viscosity, can also be fed to the working chamber 19 in a relatively short time through the constricted opening 45.

The fan coupling as described above is distinguished by a reduced torque transmission in cold starting of the engine and by low noise generation. By reason of its higher slip in cold starting the pump effect is substantially improved, so that the disconnection delay in cold starting is shortened.

While specific embodiments of the invention have been shown and described in detail to illustrate the application of the inventive principles, it will be understood that the invention may be embodied otherwise without departing from such principles.

What I claim is:

1. A fluid friction coupling, especially for a cooling fan of a fluid-cooled internal combustion engine, comprising:
   (a) a rotor rotatable about a rotation axis,
   (b) a housing rotatable about the rotation axis in relation to the rotor, containing a reservoir for shear fluid and a working chamber separated from the reservoir by a first partition and enclosing the rotor, forming at least one shear gap,
   (c) a pump device which in the relative rotation of the rotor and the housing pumps shear fluid by way of a first opening of the first partition in the region of the external diameter of the rotor from the working chamber into the reservoir,
   (d) a temperature-dependently controllable valve device for the control of the supply of shear fluid from the reservoir to the working chamber by way of a second opening of the first partition placed closer to the rotation axis than the first opening, (e) an annular buffer chamber encircling said rotation axis within said housing, a second partition extending transversely of said rotation axis located within said housing separating said buffer chamber from said working chamber, at least one inlet opening in said second partition near the inner diameter of said buffer chamber, at least one constricted opening in said second partition at the external diameter of said buffer chamber, whereby when the rotor and/or housing are not rotating, said buffer chamber receives a part of the shear fluid contained in the housing and delivers it again through said at least one constricted opening when the rotor and/or housing are in rotation.

2. A fluid friction coupling according to claim 1, wherein said at least one inlet opening for shear fluid which, when the rotor and/or housing are not in rotation, is situated at least partially below the shear fluid level.

3. A fluid friction coupling according to claim 2, wherein the inlet opening is formed as an annular gap coaxially surrounding the rotation axis.

4. A fluid friction coupling according to claim 1, wherein the buffer chamber is arranged substantially completely radially within a zone enclosed by the shear gap or gaps.

5. A fluid friction coupling according to claim 1, wherein the buffer chamber is formed by a wall of the housing and said second partition.

6. A fluid friction coupling according to claim 5, wherein the buffer chamber is provided on the side of the rotor axially remote from the partition.

* * * * *